(12) United States Patent
Wojatschek et al.

(10) Patent No.: US 6,619,590 B2
(45) Date of Patent: Sep. 16, 2003

(54) FASTENERS FOR ATTACHING A WINDSHIELD TO THE FUSELAGE SIDE FRAME OF AN AIRCRAFT VIEWING PORT

(75) Inventors: Klaus Wojatschek, Sauerlach (DE); Mark Drewe, Wuerselen (DE)

(73) Assignee: Eurocopter Deutschland GmbH, Donauworth (DE)

( * ) Notice: Subject to any disclaimer, the term of this patent is extended or adjusted under 35 U.S.C. 154(b) by 0 days.

(21) Appl. No.: 10/180,484

(22) Filed: Jun. 27, 2002

(65) Prior Publication Data

US 2003/0010867 A1 Jan. 16, 2003

(30) Foreign Application Priority Data

Jul. 11, 2001 (DE) ......................................... 101 33 730

(51) Int. Cl.[7] ................................................. B64C 1/14
(52) U.S. Cl. ................................... 244/129.3; 296/84.1
(58) Field of Search ........................ 244/129.3; 296/84.1

(56) References Cited

U.S. PATENT DOCUMENTS

| | | | | |
|---|---|---|---|---|
| 2,784,926 A | * | 3/1957 | Bonza et al. | 244/129.3 |
| 2,808,355 A | * | 10/1957 | Christie et al. | 52/208 |
| 3,679,527 A | | 7/1972 | Crick | 161/5 |
| 4,324,373 A | * | 4/1982 | Zibritosky | 244/121 |
| 4,699,335 A | * | 10/1987 | DeOms et al. | 244/129.3 |
| 4,823,229 A | * | 4/1989 | Waterland III | 361/218 |
| 5,277,384 A | * | 1/1994 | Webb | 244/129.3 |
| 2003/0062450 A1 | * | 4/2003 | Dazet et al. | 244/129.3 |

FOREIGN PATENT DOCUMENTS

| | | |
|---|---|---|
| DE | 611125 | 3/1935 |
| DE | 1942903 | 2/1970 |
| DE | 19650416 | 6/1998 |
| EP | 0287692 | 10/1988 |

* cited by examiner

*Primary Examiner*—J. Woodrow Eldred
(74) *Attorney, Agent, or Firm*—Crowell & Moring LLP

(57) ABSTRACT

A connecting device for joining a windshield with a fuselage side frame of a viewing port of an aircraft, especially a cockpit frame of a helicopter. The connecting device includes a fastening element which is fixed into position on a section of a peripheral region of the windshield through a bore hole and into a congruent bore hole of the fuselage side frame and in a fastening part with a spring device. A peripheral slit filled with a sealant is arranged in a peripheral region between the fuselage side frame and windshield. The fastening part includes a retaining nut and a spring device which can be moved and guided within a seating element and connected with the fuselage side frame. The spring device is arranged between the retaining nut and the frame.

12 Claims, 2 Drawing Sheets

FASTENERS FOR ATTACHING A WINDSHIELD TO THE FUSELAGE SIDE FRAME OF AN AIRCRAFT VIEWING PORT

BACKGROUND AND SUMMARY OF THE INVENTION

This application claims the priority of German Application No. 101 33 730.2, filed Jul. 11, 2001, the disclosure of which is expressly incorporated by reference herein.

The present invention concerns fasteners for joining a windshield to a fuselage side frame of the viewing port of an aircraft. Specifically, the cockpit frame of a helicopter, consisting of a fastening element fixed in place at a segment of the peripheral region of the windshield through a bore hole, through a congruent bore hole of the fuselage side frame, and through a frame fixture with a spring device. The peripheral slot between the fuselage side frame and the windshield is filled with a sealant.

Various connecting devices are known for producing a detachable mechanical connection between two components. Their application depends upon the function and use of the components to be joined. Especially with the mechanical connection of two components with various thermal expansion coefficients in a relatively broad temperature spectrum, special standards are imposed upon the connecting devices.

In aircraft construction, for example, in the region of the outer skin of the fuselage structure, a windshield (also referred to as window pane) consisting of a transparent plastic material for covering a corresponding viewing port (also referred to as window opening) is connected to the fuselage structure with the fuselage side framework by means of mechanically detachable connecting devices. Fuselage side frames and windshields are components with different thermal expansion coefficients. In particular, the glue between the frame and the windshield has a possible expansion of up to a multiple of that of a width of the slit in which it is seated. During the aircraft takeoff up until a cruising altitude is reached, or during the landing, or, possibly, during heating up by the sun when the aircraft is sitting on an apron, a relatively wide temperature gradient is acting on the affected components. The consequences are strong mechanical stresses in the connecting devices as well as in the corresponding individual components. Aircraft to be considered are fixed wing aircraft and rotary wing aircraft, especially helicopters.

As a consequence of these stresses, the danger of crack formation in the connecting device and/or the windshield could arise, and/or the fuselage side frame could become deformed in the area of the outer skin, as consequence of which, the sealing of the windshield could be detrimentally affected.

Use of the so-called Camloc connections as a connecting mechanism for windshields and fuselage side frames to counteract these stresses is known. A Camloc connection operates according to the principle of a bayonet lock outfitted with a spring. The functional principle corresponds to latching a bolt (pin) of a fastening element against the action of a spring force in the cavity of a fixed fastening part.

The known Camloc connection as a connecting device is here configured such that, for producing the connection, the head of the fastening element must be pressed in the direction against the spring, and then fastened by a bolt in the slit of the connecting device, or snapped into place or latched, and by means of spring force held in this locked position. In this latched position, the spring must yet possess an additional (remaining) spring cushion that would still accommodate a temperature-caused expansion of the components. An expansion compensation took place up until now by means of a lengthwise compensation in displacement of the screw head. The head of the latched fastening element consequently protrudes, as is well known, somewhat above the surface of a component in order to guarantee a sufficient, additional spring cushioning. Nonetheless this is aerodynamically detrimental to the outer skin and results in an insufficient seal against a possible moisture penetration. That the Camloc connection also has no defined stop limit for the fastening element is also problematic. The available spring cushioning is too small and cannot be regulated.

The present invention provides a mechanically detachable connecting device for attachment of a windshield to a fuselage side frame of a viewing port of an aircraft, especially to the cockpit frame of a helicopter, which prevents deformation of the windshield and which, at the same time, adapts to the aerodynamic surface of the outer skin, diminishes mechanical stress caused by the connecting device, and avoids moisture penetration around the connecting device.

The connecting device is designed so that the seating element is attached with the fastening part inside the structure of the fuselage side frame. The connecting device has the advantage that it enables a defined spring cushioning for the retaining nut as well as for the retaining element. In contrast to a normal, floating rivet nut, the connecting device of the invention with defined spring excursion allows for motion of the entire connection. In the event of an expansion of the windshield as a consequence of temperature fluctuations, the attachment can yield in the direction of screwing about a defined spring cushioning. Cross-wise to this, a motion through the screwed joint with supporting disk with an enlarged bore hole diameter in the windshield is made possible. With an encapsulation of the housing element, the advantage is attained in that no moisture can penetrate into the interior of the cabin around the connecting device.

A further advantage is that the connecting device, in the region of the outer skin, can be completely incorporated into the flat contour of the outer skin so that no additional aerodynamic resistance is caused by the connecting device.

According to an additional configuration, it is also possible to make the fastening part subject to visual inspection in connection with an encapsulated seating element through an insertable covering partition.

The seating element has guide components designed in the axial direction for guiding the retaining nut. According to a further configuration, the spring cushioning of the spring device is axially adjustable.

The retaining nut possesses an integral self-locking mechanism to prevent a separation or resetting of the nut.

Other objects, advantages and novel features of the present invention will become apparent from the following detailed description of the invention when considered in conjunction with the accompanying drawings.

BRIEF DESCRIPTION OF THE DRAWINGS

The invention is described below on the basis of a design example and appended drawings, wherein.

DETAILED DESCRIPTION OF THE DRAWINGS

Figure 1:
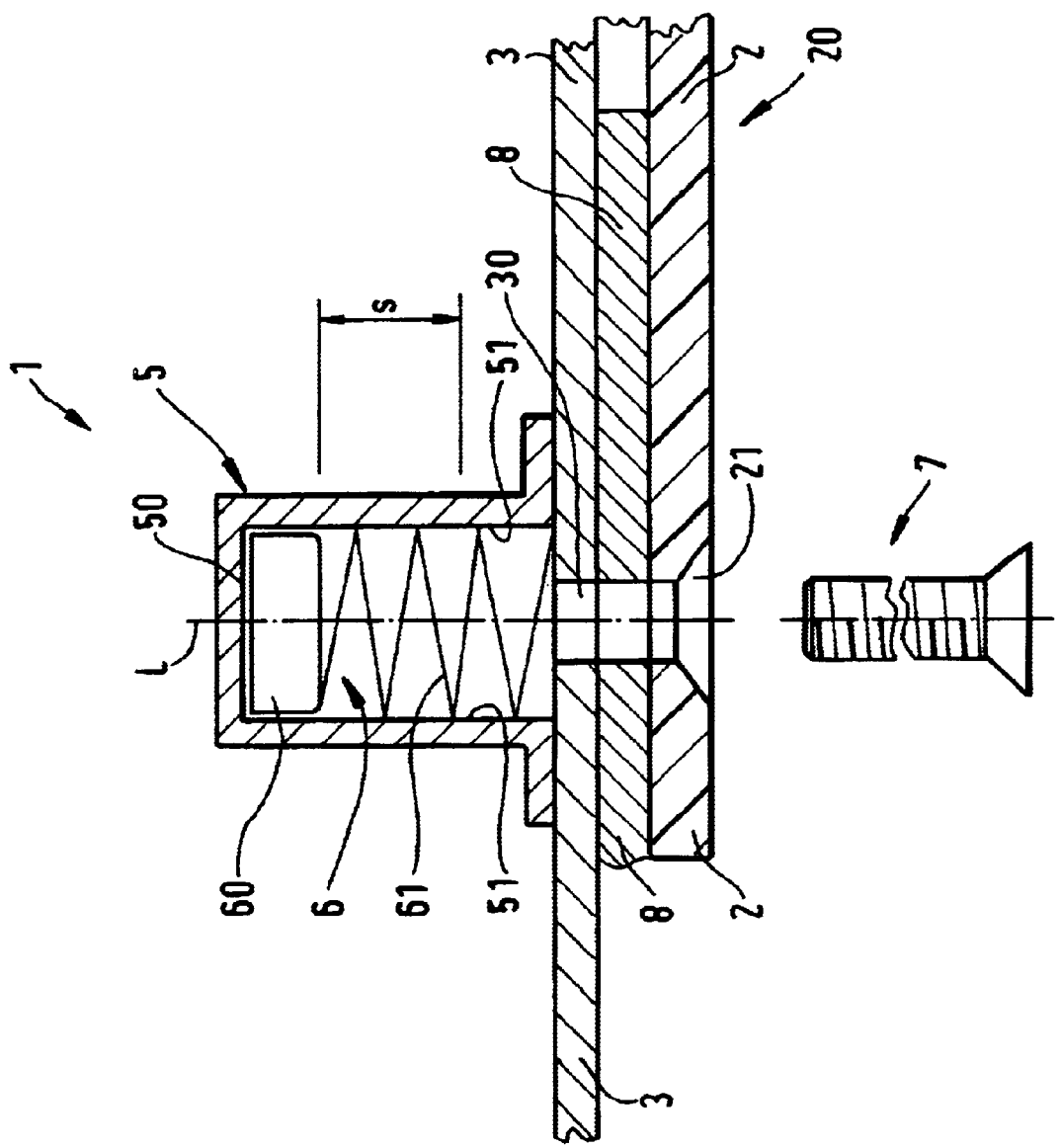
FIG. 1 provides a schematic section representation of a windshield joined to the fuselage side frame by means of the connecting device.

With FIG. 1, an individual connecting device 1 is shown which connects a segment of a viewing port 20 with a segment of the fuselage side frame 3. The viewing port 20 is a component of a windshield 2 which is made of a transparent, light-permeable plastic, for example PMMA poly-methyl methacrylate (Plexiglas). The fuselage side frame 3 can, for example, be the cockpit frame of a helicopter. A detachable, mechanical connecting device 1 is depicted, consisting of a fastening element 7, for example a screw, as well as of a seating element 5 with a fastening part 6. Such a connecting device is used for fastening bow windows and windshields of an aircraft, for example, a rotary wing aircraft, especially a helicopter.

The seating element 5 mounts and guides the fastening part 6. The seating element 5 can, for example, be designed as a frame encompassing the fastening device. Such a frame mounts and guides the fastening part 6.

In order to avoid the penetration of moisture into the cabin interior, the seating element 5 is advantageously encapsulated, whereby the encapsulation is connected tightly to the frame 3. Consequently, no moisture can penetrate into the cabin interior through the connecting device.

The fastening part 6 is comprised of a retaining nut 60 and a spring device 61 braced between nut 60 and frame 3. For manufacturing the connection, the nut 60 accommodates the fastening element 7, for example, a countersunk screw.

The windshield 2 is glued along its peripheral area with an adhesive sealant 8 on the fuselage side frame 3. In the shown segment of the viewing port 20, a bore hole 21 is located which is identical in coverage with a bore hole 30 in the frame 3. A seating element 5 with fastening part 6 is arranged on the cabin interior of the frame directly behind the bore hole 30. The fastening part 7 is passed from the windshield 2 through the two bore holes 21 and 30 and introduced into the frame-side fastened seating element 5 with fastening part 6. Here the fastening part 7 is fixed in position in the fastening part 6. The fastening part 6 has a spring device 61. This spring device 61 can, for example, be a coil spring acting as a compression spring, or as a cup spring assembly, or even an elastic rubber element. This spring device 61 holds the retaining nut 60 in a base position in seating element 5. The retaining nut 60 is, for example, pressed against a stop 50 of the seating element 5. With the introduction of a fastening element 7 into the nut 60, for example the insertion of a screw into a nut, the spring device 61 is compressed within a spring cushioning S. The spring device 61 is compressed here, but a sufficient (residual) spring cushioning is preserved. The spring cushioning S can be determined empirically. The screw pitch and screw diameter form the basis. Introducing one to two pitch threads of the screw above the nut is appropriate in order to guarantee the self-inhibition of the screw/nut connection.

The fastening element 7 can be completely integrated into the surface of the windshield 2. That is possible since the bore hole 21 is prepared for accommodating a countersunk screw. Consequently, aerodynamic resistance is avoided.

When temperature differences arise, an expansion of the glue/sealant 8 occurs. Such an expansion of the glue/sealant 8 up to 300% of its original slot thickness is possible. This expansion preferably takes place in the direction of the longitudinal axis L of fastening element 7. As a consequence, the windshield 2 is also moved in the axial direction of the fastening element 7. Corresponding to the extent of the expansion of the adhesive 8 and the windshield 2, the fastening element 7 is guided along. Guiding the fastening element 7 along in the case of expansion has the consequence that the fastening part 6, especially the nut 60, is directed axially against the force of the spring device 61 onto the frame 3. Here the nut 60 passes through a spring cushioning S. This spring cushioning S corresponds to the total of expansions of glue 8 and the windshield 2. With the movement of the nut 60 of the fastening part 6, this is guided by the seating element 5. In this way, a twisting of the nut 60 is avoided. The housing element 5 is arranged in connection with the fastening part 6. With the aid of the housing element 5, a maximal spring excursion S of the spring device 61 is fixed. A smaller spring excursion 50 is realizable as a function of the screwing depth of the fastening element 7 into the nut 60.

According to a configuration, the seating element 5 can enclose the fastening part 6 through partitions so that the nut 60 and spring device 61 are encapsulated. FIG. 1 depicts such a design. Consequently moisture cannot penetrate into the interior space of the cockpit. In order to obtain a visual inspection of the connecting device, the cover partition, which at the same time represents a stop, can be designed of an insertable rubber partition. For inspection, the rubber partition is removed and then reinserted again for closing.

In other applications, however, an encapsulated seating element 5 can be dispensed with so that the seating element 5 represents merely a mounting and guide with a stop for the nut 60. In order to improve the guidance for the nut 60, the nut can be designed ball-like, whereby two opposed guidance grooves of the seating element 5 guarantee a guidance in the direction of the screw along axis L.

The invention makes possible, with a defined spring cushioning S, a motion of the fastening element 7 and nut 60. During an expansion of the windshield 2 and the glue 8 as a consequence of temperature fluctuations, the connecting device 1 can yield in the direction of the longitudinal axis L about a defined spring cushioning S and stops this motion before the glue/sealant 8 becomes overextended and tears. Transversely to this, a motion through a screwed joint with supporting disk with enlarged bore hole diameter in the windshield 2 is already made possible.

The connecting device 1 of the invention thus prevents a deformation of the windshield and avoids the danger of crack formation in the connecting device, glue/sealant 8 and windshield 2. Fortunately, in the event of a breakage of the spring device, no additional safety risk exists.

Figure 2:
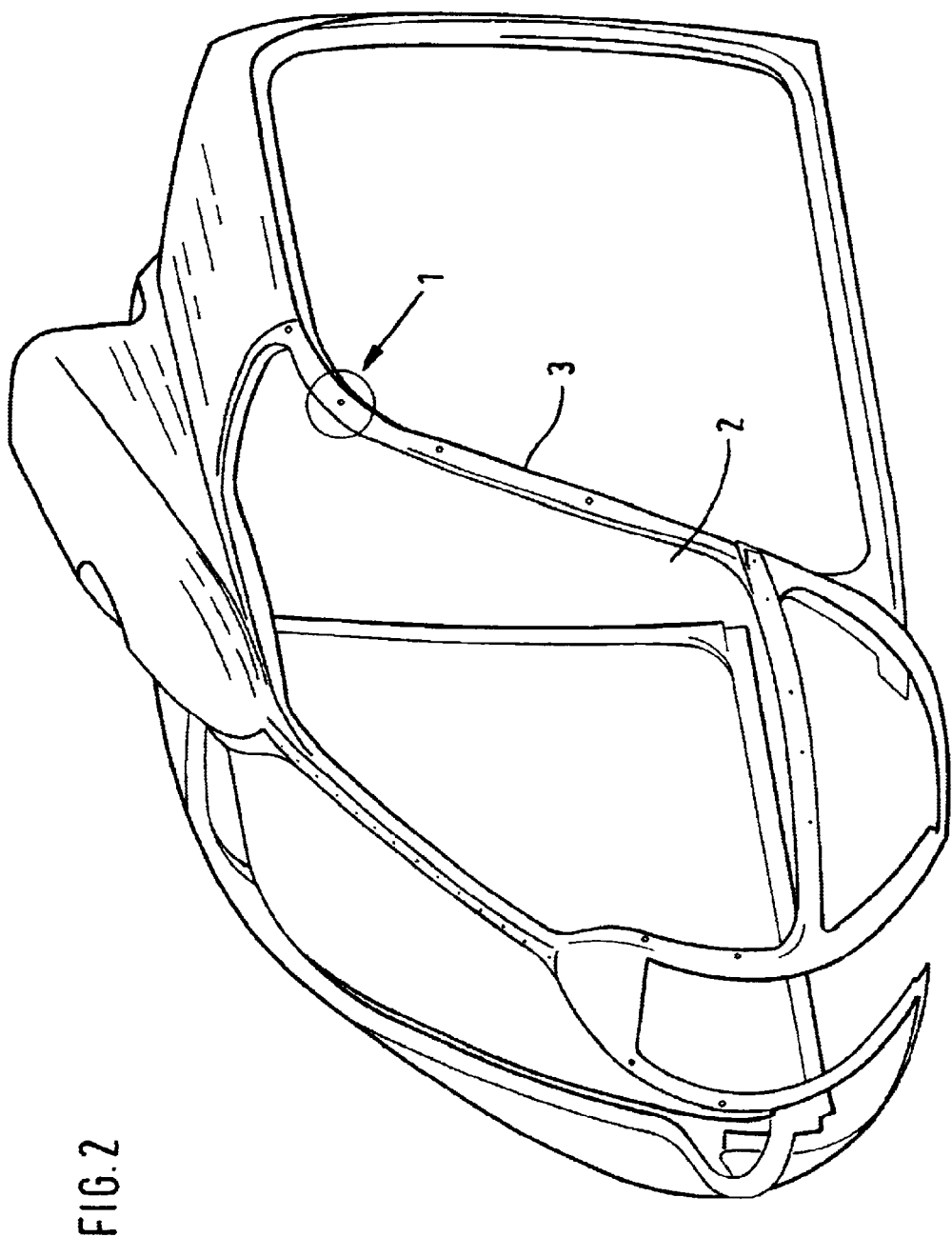
FIG. 2 depicts the cockpit frame of a helicopter with marked sites for connecting devices for connection to the cockpit canopy.

FIG. 2 with the marked points depicts those places where the connecting device of the invention comes into contact with the cockpit canopy and the frame.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A connecting device for joining a windshield with a fuselage side frame of a viewing port of an aircraft, especially a cockpit frame of a helicopter, comprising a fastening element which is fixed into position on a section of a peripheral region of the windshield through a bore hole and into a congruent bore hole of the fuselage side frame and in a fastening part with a spring device, and a peripheral slit filled with a sealant arranged in a peripheral region between the fuselage side frame and windshield, wherein the fastening part includes a retaining nut and a spring device which can be moved and guided within a seating element and connected with the fuselage side frame wherein the spring device is arranged between the retaining nut and the frame.

2. The connecting device according to claim 1, wherein the seating element is made of a tube-like body which is fastened with the frame enclosing the bore hole of the frame and forms a stop for the fastening part wherein the fastening part is axially mobile between the stop and the frame.

3. The connecting device according to claim 2, wherein the seating element is encapsulated by a partition.

4. The connecting device according to claim 2, wherein the seating element forms an axially oriented guiding element for controlling the retaining nut.

5. The connecting device according to claim 1, wherein a spring cushioning of the spring device is axially adjustable.

6. A connecting device for joining a windshield with a fuselage side frame of a viewing port of an aircraft comprising:
- a fastening element disposed through a bore hole defined by the windshield and through a bore hole defined by the fuselage side frame;
- a seating element disposed on an internal side of the fuselage side frame and over the bore hole defined by the fuselage side frame;
- a retaining nut disposed within the seating element; and
- a spring device disposed within the seating element and between the retaining nut and the fuselage side frame;
- wherein the fastening element extends through the spring device, within the seating element and into the retaining nut.

7. The connecting device of claim 6 wherein the seating element defines an enclosed space around the bore hole of the fuselage side frame.

8. The connecting device of claim 6 further comprising a sealant disposed between the windshield and the fuselage side frame and defining a bore hole therein wherein the fastening element is disposed through the bore hole defined by the sealant.

9. A method for joining a windshield with a fuselage side frame of a viewing port of an aircraft comprising:
- disposing a fastening element through a bore hole defined by the windshield and through a bore hole defined by the fuselage side frame;
- disposing the fastening element into a seating element disposed on an internal side of the fuselage side frame; and
- inserting the fastening element through a spring device and into a retaining nut, wherein the spring device and retaining nut are movably disposed within the seating element and wherein the spring device is disposed between the retaining nut and the fuselage side frame.

10. The method of claim 9 further comprising:
- moving the retaining nut axially within the seating element toward the fuselage side frame; and
- compressing the spring device between the retaining nut and fuselage side frame in response to the moving of the retaining nut.

11. The method of claim 10 wherein moving the retaining nut is in response to a thermal expansion of the windshield.

12. The method of claim 10 further comprising disposing a sealant between the windshield and the fuselage side frame and wherein moving the retaining nut is in response to a thermal expansion of the sealant.

* * * * *